US010030154B2

(12) United States Patent
Naruse et al.

(10) Patent No.: US 10,030,154 B2
(45) Date of Patent: Jul. 24, 2018

(54) POWDER MATERIAL FOR THREE-DIMENSIONAL MODELING, MATERIAL SET FOR 3D MODELING, METHOD OF MANUFACTURING THREE-DIMENSIONAL OBJECT, DEVICE FOR MANUFACTURING THREE-DIMENSIONAL OBJECT, AND THREE-DIMENSIONAL OBJECT

(71) Applicants: Mitsuru Naruse, Shizuoka (JP); Yasuo Suzuki, Shizuoka (JP); Nozomu Tamoto, Shizuoka (JP); Yasuyuki Yamashita, Shizuoka (JP); Hitoshi Iwatsuki, Shizuoka (JP); Kazumi Ohtaki, Shizuoka (JP)

(72) Inventors: Mitsuru Naruse, Shizuoka (JP); Yasuo Suzuki, Shizuoka (JP); Nozomu Tamoto, Shizuoka (JP); Yasuyuki Yamashita, Shizuoka (JP); Hitoshi Iwatsuki, Shizuoka (JP); Kazumi Ohtaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/073,192

(22) Filed: Mar. 17, 2016

(65) Prior Publication Data
US 2016/0272817 A1 Sep. 22, 2016

(30) Foreign Application Priority Data
Mar. 20, 2015 (JP) ................. 2015-058189

(51) Int. Cl.
B22F 3/22 (2006.01)
B22F 1/00 (2006.01)
C09D 5/03 (2006.01)
B22F 3/00 (2006.01)
B33Y 70/00 (2015.01)
C09D 101/28 (2006.01)
C09D 129/04 (2006.01)
B29C 64/165 (2017.01)
B33Y 10/00 (2015.01)
B33Y 30/00 (2015.01)

(52) U.S. Cl.
CPC ............. *C09D 5/03* (2013.01); *B22F 1/0062* (2013.01); *B22F 1/0074* (2013.01); *B22F 3/008* (2013.01); *B22F 3/22* (2013.01); *B29C 64/165* (2017.08); *B33Y 70/00* (2014.12); *C09D 101/28* (2013.01); *C09D 129/04* (2013.01); *B22F 2998/10* (2013.01); *B33Y 10/00* (2014.12); *B33Y 30/00* (2014.12)

(58) Field of Classification Search
CPC ... B22F 3/22; B22F 1/0074; B22F 2001/0066
See application file for complete search history.

(56) References Cited

U.S. PATENT DOCUMENTS

| 3,303,147 | A | * | 2/1967 | Elden | C04B 28/14 524/21 |
| 3,726,700 | A | * | 4/1973 | Wildt | C09C 1/0087 106/437 |
| 3,897,577 | A | * | 7/1975 | Hymes | B05D 5/06 15/230.11 |
| 4,496,506 | A | * | 1/1985 | Sakato | C04B 35/634 264/109 |
| 4,526,734 | A | * | 7/1985 | Enomoto | C04B 35/565 264/13 |
| 4,677,082 | A | * | 6/1987 | Alford | C04B 35/634 501/1 |
| 4,761,284 | A | * | 8/1988 | Nishimura | A61K 33/44 424/125 |
| 5,069,714 | A | * | 12/1991 | Gosselin | B22F 1/0059 75/252 |
| 5,135,894 | A | * | 8/1992 | Kendall | B22F 1/0007 501/94 |
| 5,590,387 | A | * | 12/1996 | Schmidt | B22F 1/0014 419/36 |
| 6,126,712 | A | * | 10/2000 | Hohne | B22F 1/0096 75/243 |
| 6,416,850 | B1 | * | 7/2002 | Bredt | B28B 1/00 106/206.1 |
| 7,722,802 | B2 | * | 5/2010 | Pfeifer | B22F 1/02 419/7 |

(Continued)

FOREIGN PATENT DOCUMENTS

JP 5862739 1/2016
WO WO2004/073961 A2 9/2004

(Continued)

OTHER PUBLICATIONS

Farag et al. (Materials Letters 132, 2014, 111-115) (Year: 2014).*
Extended European Search Report dated Aug. 10, 2016 in Patent Application No. 16158437.0.
Yirong Xu, et al., "Thermoreversible and salt-sensitive turbidity of methylcellulose in aqueous solution," Polymer, Elsevier Science Publishers, vol. 46, No. 18, XP027727198, Aug. 23, 2005, pp. 7410-7417.
U.S. Appl. No. 14/968,184, filed Dec. 14, 2015.
U.S. Appl. No. 14/938,257, filed Nov. 11, 2015.

Primary Examiner — Liam J Heincer
(74) Attorney, Agent, or Firm — Oblon, McClelland, Maier & Neustadt, L.L.P.

(57) ABSTRACT

A powder material for three-dimensional modeling includes a base particle and a resin including a first water soluble resin and a second water soluble resin, wherein a first aqueous solution of the first water soluble resin having a concentration of two percent by mass has a thermally reversible sol-gel phase transition and is gelated at temperatures higher than a first phase transition temperature of the first aqueous solution.

17 Claims, 2 Drawing Sheets

(56) References Cited

U.S. PATENT DOCUMENTS

| | | | |
|---|---|---|---|
| 8,268,901 B2* | 9/2012 | Britton | C08J 9/0061 521/182 |
| 2001/0006451 A1* | 7/2001 | Miyazaki | B32B 18/00 361/321.2 |
| 2002/0016387 A1 | 2/2002 | Shen | |
| 2002/0103274 A1* | 8/2002 | Satoh | C08J 3/005 523/403 |
| 2003/0114568 A1* | 6/2003 | Sato | B82Y 30/00 524/431 |
| 2003/0114936 A1* | 6/2003 | Sherwood | A61F 2/28 623/23.58 |
| 2004/0056378 A1* | 3/2004 | Bredt | B29C 67/0081 264/109 |
| 2005/0017394 A1* | 1/2005 | Hochsmann | B29C 67/0081 264/113 |
| 2005/0186331 A1* | 8/2005 | Fujimoto | B41M 5/52 427/66 |
| 2005/0276976 A1 | 12/2005 | Pfeifer et al. | |
| 2006/0090592 A1* | 5/2006 | Quirmbach | B22F 1/0059 75/231 |
| 2006/0167147 A1* | 7/2006 | Asgari | A61K 9/0024 524/174 |
| 2006/0251535 A1 | 11/2006 | Pfeifer et al. | |
| 2006/0251826 A1 | 11/2006 | Pfeifer et al. | |
| 2007/0213430 A1* | 9/2007 | Bauer | C04B 24/2623 524/5 |
| 2009/0298033 A1* | 12/2009 | Suzuki | B33Y 50/02 434/263 |
| 2010/0189901 A1* | 7/2010 | Chung | B22F 9/24 427/256 |
| 2011/0065576 A1* | 3/2011 | Campbell | B41M 5/267 503/215 |
| 2011/0086097 A1* | 4/2011 | Kaufmann | A61K 33/26 424/474 |
| 2012/0010066 A1* | 1/2012 | Fischer | A61K 6/0215 501/32 |
| 2012/0018915 A1* | 1/2012 | Ookubo | B29C 67/0081 264/113 |
| 2012/0052300 A1* | 3/2012 | Nozari | B82Y 30/00 428/402 |
| 2014/0050795 A1* | 2/2014 | Morton | A61K 47/32 424/490 |
| 2016/0040025 A1 | 2/2016 | Norikane et al. | |
| 2016/0160021 A1* | 6/2016 | Kojima | B29C 67/0081 428/201 |
| 2016/0168453 A1* | 6/2016 | Florio | C09K 8/80 507/203 |
| 2016/0214320 A1* | 7/2016 | Sasaki | B29C 67/0081 |
| 2016/0230026 A1* | 8/2016 | Furusawa | C09D 5/24 |
| 2016/0236412 A1* | 8/2016 | Kusahara | B28B 7/465 |
| 2016/0272844 A1* | 9/2016 | Osaka | B22F 1/0062 |
| 2016/0288206 A1* | 10/2016 | Ohtaki | B22F 1/02 |
| 2016/0310924 A1* | 10/2016 | Nakatomi | H01M 4/587 |
| 2016/0368806 A1* | 12/2016 | Yamaguchi | B33Y 10/00 |

FOREIGN PATENT DOCUMENTS

| | | |
|---|---|---|
| WO | WO2010/098441 A1 | 9/2010 |
| WO | WO2015/046629 A1 | 4/2015 |

* cited by examiner

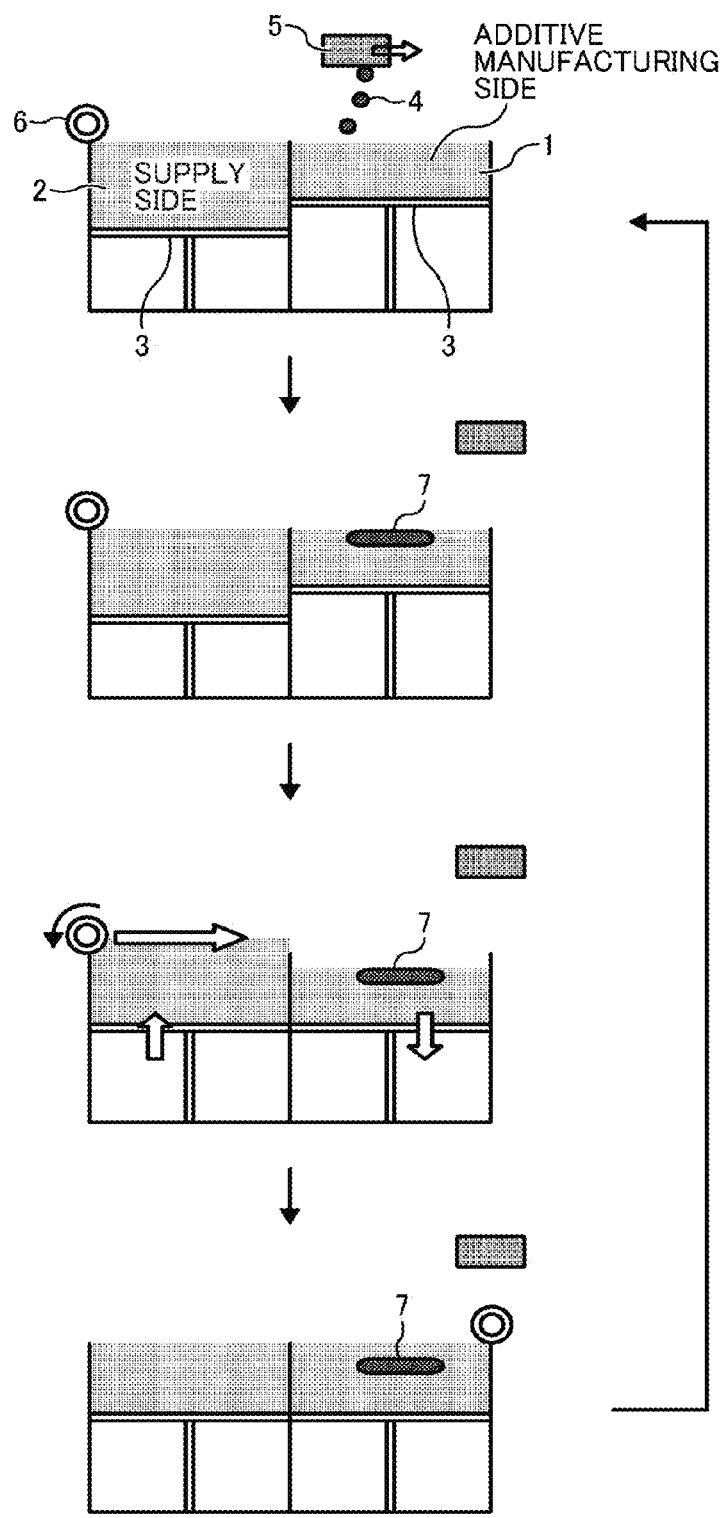

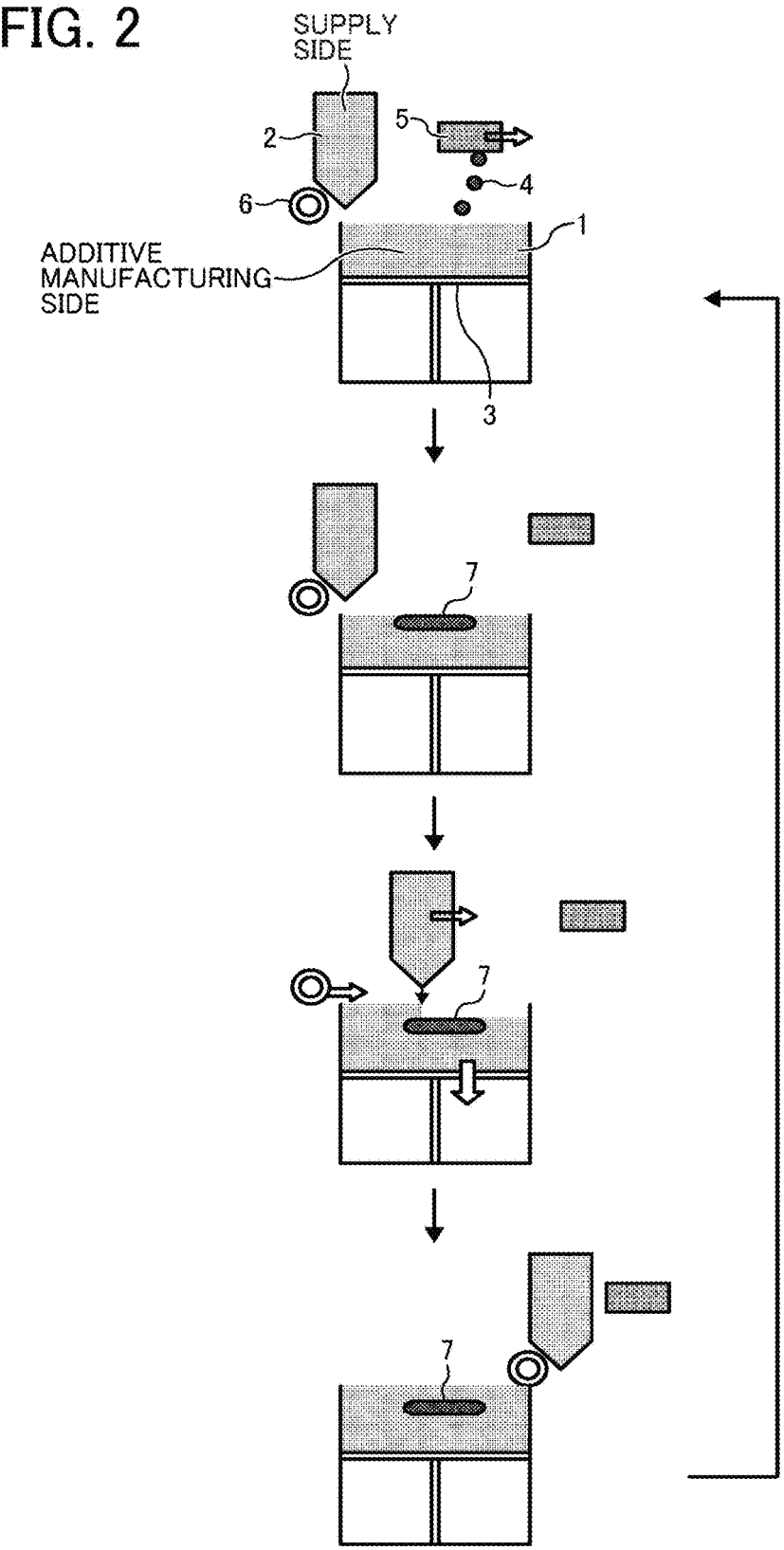

POWDER MATERIAL FOR THREE-DIMENSIONAL MODELING, MATERIAL SET FOR 3D MODELING, METHOD OF MANUFACTURING THREE-DIMENSIONAL OBJECT, DEVICE FOR MANUFACTURING THREE-DIMENSIONAL OBJECT, AND THREE-DIMENSIONAL OBJECT

CROSS-REFERENCE TO RELATED APPLICATIONS

This patent application is based on and claims priority pursuant to 35 U.S.C. § 119 to Japanese Patent Application No. 2015-058189 filed on Mar. 20, 2015, in the Japan Patent Office, the entire disclosure of which is hereby incorporated by reference herein.

BACKGROUND

Technical Field

The present invention relates to a powder material for three-dimensional (3D) modeling, a material set for 3D modeling, a device for manufacturing a 3D object, a method of manufacturing a 3D object, and a 3D object.

Background Art

Lamination modeling (additive manufacturing) methods using three-dimensional (3D) printers capable of manufacturing more complex and finer 3D objects on demand are introduced to supersede typical methods of manufacturing 3D object by utilizing a shaping die. In particular, powder additive manufacturing methods are used in the case of a 3D object made of metal or inorganic compounds.

SUMMARY

According to the present invention, provided is an improved powder material for three-dimensional modeling including a base particle and a resin including a first water soluble resin and a second water soluble resin, wherein a first aqueous solution of the first water soluble resin having a concentration of two percent by mass has a thermally reversible sol-gel phase transition and is gelated at temperatures higher than a first phase transition temperature of the first aqueous solution

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a schematic diagram illustrating an example of the device for manufacturing a 3D object according to an embodiment of the present invention; and FIG. 2 is a schematic diagram illustrating another example of the device for manufacturing a 3D object according to an embodiment of the present invention.

DETAILED DESCRIPTION

When a 3D object is manufactured by the powder additive manufacturing method, taken out of the laminated powder material layers, and thereafter is subject to post-processing such as sintering, the object has to have strength to bear such processing.

In an attempt to obtain such strength, a powder material for 3D modeling is prepared by granulating a liquid mixture of a water soluble inorganic component and a water soluble resin by a dry spraying method to uniformly contain the water soluble inorganic component and the water soluble resin in a particle. Specific examples of such resins are polyvinyl alcohol (PVA) and cellulose resins.

However, if a water soluble polymer is used as the water soluble resin, the powder material easily absorbs moisture in the air particularly when the powder material is stored in a high temperature and high humidity environment. As a result, agglomeration tends to occur.

Accordingly, the present disclosure is to provide a powder material for 3D modeling suitable to manufacture a 3D object having a sufficient strength to maintain its complex form and have excellent storage property to prevent agglomeration even in a high temperature and high humidity environment.

In the present disclosure, the water soluble resin means, for example, when 1 g of the resin is mixed and stirred in 100 g of water at 30 degrees C., 90 percent by mass or more of the resin is dissolved therein.

Powder Material for 3D Modeling

The powder material for 3D modeling contains a base particle, a resin, and other optional components. The resin includes a first water soluble resin, a second water soluble resin, and other optional components.

Most water soluble resins are dissolved more at higher temperatures. Therefore, in a case of a powder material for 3D modeling containing a water soluble resin, if part of the water soluble resin is dissolved due to moisture in the air, the powder material adheres to each other and agglomerates, easily forming blocks. This tends to occur in a high temperature and high humidity environment in particular. That is, such a powder material is disadvantageous in light of storage property.

On the other hand, unlike most water soluble resins, there are particular water soluble resins having such a property that they lose water solubility as the temperature of water serving as solvent is high and gain water solubility as the temperature of water is low. Therefore, the present inventors have focused attention on the difference between the properties of the most water soluble resins and the particular water soluble resins described above and have found that a combinational use of the most water soluble resin (first resin) and the particular water soluble resin (second resin) solves this storage issue.

In a high temperature and high moisture environment in summer, the amount of moisture in the air increases. In a high temperature environment, the water solubility of the first water soluble resin deteriorates, thereby preventing agglomeration of the powder material for 3D modeling. In a low temperature and high moisture environment where bedewing occurs, water solubility of the second water soluble resin deteriorates, which prevents agglomeration of the powder materials at low temperatures, which would occur if the first water soluble resin were solely used for the powder material.

First Water Soluble Resin

The first water soluble resin has no particular limit and can be selected from known water soluble resins as long as the first aqueous solution of the first water soluble resin having a concentration of two percent by mass has a thermally reversible sol-gel phase transition in which the solution is gelated at temperatures higher than the phase transition temperature.

Specific examples of the first water soluble resin include, but are not limited to, methyl cellulose, ethyl cellulose, and hydroxy propyl methyl cellulose. These resins include those having various kinds of viscosity or those having different substitutions such as a methoxy group and a hydroxypropyl group. These can be used alone or in combination.

The methyl cellulose is available on market and a specific example thereof is METOLOSE SM (manufactured by Shin-Etsu Chemical Co., Ltd.). The hydroxy propyl methyl cellulose is available on market and specific examples thereof include, but are not limited to, METOLOSE SH (manufactured by Shin-Etsu Chemical Co., Ltd.), Marpolose 60MP-4000 (manufactured by Matsumoto Yushi-Seiyaku Co., Ltd.), Marpolose 65MP-4000 (manufactured by Matsumoto Yushi-Seiyaku Co., Ltd.), and Marpolose 90MP-4000 (manufactured by Matsumoto Yushi-Seiyaku Co., Ltd.).

Thermal Reversible Sol-Gel Phase Transition and Phase Transition Temperature

"Having thermally reversible sol-gel phase transition" means that sol phase transition and gel phase transition reversibly occur depending on temperatures and "phase transition temperature" means the temperature at which the sol phase transition or the gel phase transition occurs.

In the present disclosure, the first aqueous solution of the first water soluble resin having a concentration of two percent by mass has a thermally reversible sol-gel phase transition in which the solution is gelated at temperatures higher than the phase transition temperature.

That is, when the liquid temperature of the solution rises, viscosity thereof sharply rises at a temperature (phase transition temperature), meaning that the solution is gelated. Thereafter, when the temperature is lowered, the viscosity decreases and the gel is back to the original solution.

For example, the first aqueous solution of the first water soluble resin having a concentration of two percent by mass is almost clear aqueous solution at around 20 degrees C. However, as the liquid temperature rises, the solution is gradually clouded (solated) and viscosity thereof begins to lower and sharply increases at a particular temperature and higher. In the present disclosure, a twisted vibration type viscometer is used to measure the viscosity of the first aqueous solution of the first water soluble resin having a concentration of two percent by mass while raising the temperature of the solution at a rate of 1 degree C. per minute. The transfer point at which viscosity changes from decrease to increase is determined as the gel transfer point (phase transition temperature).

The phase transition temperature of the first aqueous solution of the first water soluble resin having a concentration of two percent by mass is suitably set depending on the storage environment and has no particular limit. For example, the temperature is preferably 90 degrees C. or lower, more preferably 65 degrees C. or lower, and furthermore preferably 55 degrees C. or lower. The temperature of the lower limit is preferably 35 degrees C. or higher and more preferably 40 degrees C. or higher.

Viscosity of Two Percent by Mass Aqueous Solution of First Water Soluble Resin at 20 Degrees C.

The viscosity of the first aqueous solution of the first water soluble resin having a concentration of two percent by mass at 20 degrees C. is an indicator of the molecular weight of the resin and can be determined taking into account the ratio of the first water soluble resin to the second water soluble resin, strength of a 3D object, storage property of powder material for 3D modeling, etc. It is preferably from 2 mPa·s to 30,000 mPa·s, more preferably from 3 mPa·s to 25 mPa·s, and most preferably from 6 mPa·s to 25 mPa·s.

The viscosity of the first aqueous solution of the first water soluble resin having a concentration of two percent by mass at 20 degrees C. can be measured by a rotation viscometer (for example, TVE-35H, manufactured by TOKI SANGYO CO., LTD.).

Second Water Soluble Resin

Unlike the first water soluble resin, the second water soluble resin has no gel phase transition in a temperature rising step. An example thereof is that the second aqueous solution of the second water soluble resin having a concentration of two percent by mass has a thermally reversible sol-gel phase transition and is gelated at temperatures lower than the phase transition temperature or no thermally reversible sol-gel phase transition. The second water soluble resin can be selected from known water soluble resins to a particular application.

In the present disclosure, to sufficiently demonstrate strength and storage stability, the second water soluble resin preferably has a strong attachment strength. Due to this, the attachment strength of the first water soluble resin is complemented by that of the second water soluble resin. As a result, the strength of a 3D object manufactured by using the powder material for 3D modeling is enhanced.

Examples of the second water soluble resin are water soluble condensation-based synthetic resins, addition-based synthetic resins, and natural polymers.

Specific examples of the condensation-based synthetic resins include, but are not limited to, water soluble polyethylene glycol, polyamide-based resins, polyester-based resins, polyether-based resins, polyurethane resins, and copolymers containing these.

Specific examples of the addition-based synthetic resins include, but are not limited to, water soluble poly(meth)acrylic acid (salt)-based resins such as sodium polyacryate, polyvinyl pyrolidone, and polyvinyl alcohol, maleic acid (salt)-based resins, and copolymers containing these. Sodium polyacryate is available on market and a specific example thereof is JURYMER® AC-103P, (manufactured by TOAGOSEI CO., LTD.).

A specific example of the natural polymers is modified celluloses.

These can be used alone or in combination.

As the second water soluble resin, polyvinyl alcohol is preferable in terms that the resin itself has strong attachment strength and high crystallinity and is little affected by environment humidity. Examples of polyvinyl alcohol are partially-saponified polyvinyl alcohol, intermediate saponified polyvinyl alcohol, completely saponified polyvinyl alcohol, and modified polyvinyl. Of these, completely saponified polyvinyl alcohol and modified polyvinyl are preferable in terms of obtaining sufficient strength of a 3D object manufactured by using the powder material for 3D modeling.

Specific examples of the modified polyvinyl alcohol include, but are not limited to, acetoacetyl group-modified polyvinyl alcohol, acetyl group-modified polyvinyl alcohol, diacetone acrylamide-modified polyvinyl alcohol, butanediol-modified polyvinyl alcohol, and completely saponified polyvinyl alcohol. Of these, acetoacetyl group-modified polyvinyl alcohol and diacetone acryl amide-modified polyvinyl alcohol are preferable in terms of enhancement of strength, particularly when used in combination with a cross linking agent.

The acetoacetyl group-modified polyvinyl alcohol is available on market and a specific example thereof is Z-100 (manufactured by The Nippon Synthetic Chemical Industry Co., Ltd.).

The diacetone acrylamide-modified polyvinyl alcohol is available on market. A specific example thereof is DF-05 (manufactured by JAPAN VAM & POVAL CO., LTD.).

The butanediol-modified polyvinyl alcohol is available on market and a specific example thereof is Nichigo G-Polymer™ OKS-8041 (manufactured by The Nippon Synthetic Chemical Industry Co., Ltd.).

The completely saponified polyvinyl alcohol is available on market and a specific example thereof is PVA-105 (manufactured by KURARAY CO., LTD.).

As the second water soluble resin, it is most preferable to use a polyvinyl alcohol having a high crystallinity and attachment strength in combination with cellulose having a viscosity of from 4 mPa·s to 25 mPa·s for the second aqueous solution of the second water soluble resin having a concentration of two percent by mass. By this combination, the powder material for 3D modeling has excellent durability against moisture, thereby improving storage property. Also, the strength of a 3D object manufactured by using the powder material for 3D modeling is enhanced.

The viscosity of the second aqueous solution of the second water soluble resin having a concentration of two percent by mass at 20 degrees C. can be measured by a rotation viscometer (for example, TVE-35H, manufactured by TOKI SANGYO CO., LTD.).

Average Degree of Polymerization of Second Water Soluble Resin

The average degree of polymerization of the second water soluble resin is preferably from 300 to 2,000 and more preferably from 500 to 1,700. When the average degree of polymerization of a resin is between 300 and 2,000, a 3D object manufactured by using the powder material for 3D modeling has a sufficient strength.

Mass Ratio of First Water Soluble Resin to Second Water Soluble Resin

The mass ratio (AB) of the first water soluble resin (A) to the second water soluble resin (B) in the resin is preferably from 0.1/99.9 to 50/50, more preferably from 0.1/99.9 to 30/70, furthermore preferably from 0.1/99.9 to 10/90, and particularly preferably from 3/97 to 10/90. When the content of the first water soluble resin is less than 0.1 percent by mass, the storage property of the powder material for 3D modeling is not sufficient. When the content of the first water soluble resin is 0.1 percent by mass or greater, the first water soluble resin is considered to be locally present on the surface of the covering resin of the powder material for 3D modeling during drying of the powder material for 3D modeling due to surface active effect of the first water soluble resin. As a result, the storage property of the powder material for 3D modeling is considered to be improved. In addition, when the content of the first water soluble resin is 50 percent by mass or less, the strength of a 3D object manufactured by using the powder material for 3D modeling is secured.

Base Particle

Examples of materials of the base particle (material) are metal, ceramic, carbon, polymers, wood, and biocompatible materials. Of these, metal and ceramic, which can be bearable to sintering are preferable in terms of manufacturing a 3D object having a high level of strength. In addition, the base particle is preferably insoluble in a solution of the resin for use in the material set for 3D modeling of the present disclosure Specific examples of the metal include, but are not limited to, iron, copper, titanium, silver, and alloys thereof. Of the alloys, stainless steel (SUS) is preferable. A specific example of the stainless steel (SUS) is SUS316L.

Specific examples of the ceramic include, but are not limited to, metal oxides such as silica ($SiO_2$), alumina ($Al_2O_3$), zirconia ($ZrO_2$), and titania ($TiO_2$).

Specific examples of the carbon include, but are not limited to, graphite, graphen, carbon nanotube, carbon nanohorn, and fullerene.

Examples of the polymer are known resins insoluble in water.

Engineering plastic, etc. are also usable.

Specific examples of the wood include, but are not limited to, wood chip and cellulose.

Specific examples of the biocompatible materials include, but are not limited to, polylactic acid and calcium phosphate.

These materials can be used alone or in combination.

It is possible to use products available on market formed of these materials as the base particle. Specific examples of such products include, but are not limited to, SUS316L (PSS316L, manufactured by Sanyo Special Steel Co., Ltd.), $SiO_2$ (EXCELICA SE-15K, manufactured by Tokuyama Corporation), $Al_2O_3$ (TAIMICRON TM-5D, manufactured by TAIMEI CHEMICALS Co., Ltd.), and $ZrO_2$ (TZ-B53, manufactured by TOSOH CORPORATION).

The base particle may be subject to known surface reforming treatment in order to improve affinity with the resin.

The volume average particle diameter of the base particle is not particularly limited. The volume average particle diameter is preferably from 0.1 μm to 500 μm, more preferably from 5 μm to 300 μm, and furthermore preferably from 10 μm to 250 μm.

When the volume average particle diameter is in the range of from 0.1 μm to 500 μm, the manufacturing efficiency of 3D objects is excellent and handling property is also good. When the volume average particle diameter is less than 500 μm or less and a powder material layer is formed in a particular thickness, the filling rate of the powder material for 3D modeling in the layer is improved, meaning that voids, etc. do not easily appear in the thus-obtained 3D object.

The volume average particle diameter of the base particle can be measured according to known methods using a known particle diameter measuring instrument such as Microtrac HRA (manufactured by NIKKISO CO., LTD.).

The particle size distribution of the base particle is not particularly limited and can be suitably selected to a particular application.

The shape, surface area, circularity, fluidity, wettability, etc. of the base particle are suitably selected to a particular application.

Method of Covering with Resin

The powder material for 3D modeling of the present disclosure contains the base particle and the resin mentioned above. It is preferable that the base particle should be covered with the resin.

The method of covering the base particle with a resin is not particularly limited. The base particle can be covered by a known method. For example, a tumbling fluidizing coating method, a spray drying method, a stirring mixing addition method, a tipping method, a kneader coating method, etc. are suitable. Of these, a tumbling fluidizing coating method is preferable because the coverage layer is beautifully coated.

Method of Covering with Resin

The resin preferably has an average coverage thickness of from 5 nm to 500 nm, more preferably from 50 nm to 300 nm, and furthermore preferably from 100 nm to 200 nm.

When the coverage thickness is in the range of from 5 nm to 500 nm, the strength of a manufactured 3D object and the dimension accuracy during sintering are improved.

The coverage thickness can be obtained by, for example, embedding the powder material for 3D modeling in an acrylic resin, etc., exposing the surface of the base particle by etching, etc., and thereafter measuring the thickness with a scanning tunneling microscope, an atomic force microscope, or a scanning electron microscope.

Specifically, a sample for observation is prepared by polishing the surface of the powder material for 3D modeling with emery paper and thereafter slightly polishing the surface with a wet cloth to dissolve the resin portion. Next, the border between the base portion and the resin portion, exposed to the surface is observed by a field-emission-type scanning electron microscope (FE-SEM) and the length between the surface of the resin portion and the border is measured as the coverage thickness. Thereafter, the average of the ten measured points is obtained as the coverage thickness (average thickness).

The coverage ratio (area ratio) of the surface of the base particle is not particularly limited and can be suitably selected to a particular application. For example, it is preferably 15 percent or more, more preferably 50 percent or more, and particularly preferably 80 percent or more. The higher the coverage ratio is, the stronger a 3D object becomes.

The coverage ratio is obtained by, for example, observing a photograph of the powder material for 3D modeling and calculating the average of the area ratio (percent) of the portion covered with the resin to all the area of the surface of the base particle about the powder material for 3D modeling in the two-dimensional photograph.

Using a powder material for 3D modeling in which the base particle is covered with the resin containing the first water soluble resin and the second water soluble resin and the device for manufacturing a 3D object of the present disclosure, the obtained 3D object has high strength in comparison with when using the powder material for 3D modeling obtained by mixing the base particle with the resin. Inferentially, this improvement is caused by the mechanism that the resin distribution between the base particles becomes uniform when the base particle is covered with the resin.

Other Components

The other optional components are not particularly limited and can be selected to a suitable application. Examples thereof are a fluidizer, a filler, a leveling agent, a sintering helping agent, and a surfactant.

Addition of a fluidizer to the powder material for 3D modeling is preferable because layers of the powder material for 3D modeling are efficiently formed with ease. It is preferable to contain a filler because voids etc. do not easily appear in an obtained cured object (3D object, cured object for sintering). Addition of a leveling agent to the powder material for 3D modeling is preferable because the wettability of the powder material for 3D modeling is improved, so that handling becomes easy. Addition of a sintering helping agent to the powder material for 3D modeling is preferable because sintering at lower temperatures is made possible in sintering treatment for an obtained object (3D object, cured object for sintering).

Properties of Powder Material for 3D Modeling

The volume average particle diameter of the powder material for 3D modeling is not particularly limited and can be suitably determined to a particular application. For example, the volume average particle diameter is preferably from 3 μm to 250 μm, more preferably from 3 μm to 200 μm, furthermore preferably from 5 μm to 150 μm, and particularly preferably from 10 μm to 85 μm.

When the volume average particle diameter is 3 μm or greater, fluidity of the powder material for 3D modeling is improved, thereby easily forming a layer and increasing smoothness of the surface of the powder material for 3D modeling. As a consequence, the manufacturing efficiency and handling property, and dimension accuracy of a 3D object tend to be better. In addition, when the volume average particle diameter is 250 μm or less, the space between the powder particles is reduced, thereby decreasing the void ratio of a thus-obtained 3D object, which contributes to enhancement of the strength thereof. Accordingly, the volume average particle diameter is preferably from 3 μm to 250 μm to strike a balance between the dimension accuracy and the strength.

The volume average particle diameter of the powder material for 3D modeling can be measured by a known particle size measuring device, such as Microtrac HRA (manufactured by NIKKISO CO., LTD.) according to a known method.

The particle size distribution of the powder material for 3D modeling is not particularly limited and can be suitably determined to a particular application.

The powder material for 3D modeling of the present disclosure can be applied to simple and efficient manufacturing of various modeled objects and structures and also particularly suitably applied to the material set for 3D modeling, the method of manufacturing a 3D object, and the device for manufacturing a 3D object of the present disclosure described later.

Material Set for 3D Modeling

The set for 3D modeling of the present disclosure contains the powder material for 3D modeling of the present disclosure, a solution that contains a solvent to dissolve the resin covering the base particle, and other optional components.

Solution

The solution contains the solvent to dissolve the resin covering the base particle, preferably a cross-linking agent, and other optional components.

Solvent

As the solvent, no particular limit is applied as long as the solvent (medium) can dissolve the resin covering the base particle. Specific examples thereof include, but are not limited to, aqueous media such as water, ethers of alcohols such as ethanol, and ketones, aliphatic hydrocarbons, ether-based solvents such as glycol ether, ester-based solvents such as ethylacetate, ketone-based methylethyl ketone, and higher alcohols. Of these, water is preferable.

As the water, deionized water, ultrafiltered water, reverse osmosis water, pure water such as distilled water, and ultra pure water can be used.

If water is used as the solvent of the solution, thickening of the solvent is avoided when the solvent dries, which is preferable in terms that defective discharging does not occur even when it is applied to an inkjet method.

Cross-Linking Agent

By applying the solution to the powder material for 3D modeling, the resin in the powder material for 3D modeling is dissolved in the solvent in the solution. Therefore, the base material particles adhere to each other as the solvent dries, so that a 3D object is formed. While forming the object, if the solution contains a cross-linking agent, a cross-linking structure with the resin is formed, thereby further enhancing the strength of the obtained 3D object.

The cross-linking agent is not particularly limited. Preferably, such an agent conducts cross-linking reaction with the functional group contained in the resin in the powder material for 3D modeling. For example, metal-based cross-linking agent containing a metal element such as zirconia-based cross-linking agents and titanium-based cross-linking agents, and metal chelating agent, and water-soluble organic cross-linking agents are suitable.

Specific examples of the zirconia-based cross-linking agents include, but are not limited to, zirconium chloride and ammonium zirconium carbonate.

Specific examples of the titanium-based cross-linking agents include, but are not limited to, titanium acrylate and titanium alkoxide.

Specific examples of the chelating agents include, but are not limited to, organic titanium chelate and organic zirconium chelate.

Specific examples of the water soluble organic cross-linking agents include, but are not limited to, compounds including a carbodiimide group, bisvinylsulfonic compounds, oxazoline compounds, and dihydrazide compounds. A specific example of the dihydrazide compounds is adipic acid dihydrazide.

These can be used alone or in combination. Of these, compounds including metal such as zirconia or titanium are preferable and ammonium zirconium carbonate is more preferable.

The content (concentration) of the cross-linking agent has no particular limit and can be selected to a particular application. The concentration of from 0.1 parts by mass (percent by mass) to 50 parts by mass (percent by mass) to 100 parts by mass of the resin is preferable. The concentration of from 0.5 part by mass (percent by mass) to 40 parts by mass (percent by mass) to 100 parts by mass of the resin is more preferable. The concentration of from 1 part by mass (percent by mass) to 35 parts by mass (percent by mass) to 100 parts by mass of the resin is particularly preferable Other Components Examples of the other optional components are fluidity adjusters, surfactants, preservatives, antiseptic agents, stabilizing agents, pH regulators, water soluble solvents, and wetting agents.

Since the material set for 3D modeling of the present disclosure can be suitably used for various shape-forming objects and structures. The kit can be particularly suitably applied to the method of manufacturing a 3D object of the present disclosure, the device for manufacturing a 3D object of the present disclosure, and the 3D object obtained in the present disclosure.

Three-Dimensional (3D) Object

The three-dimensional object (3D object) obtained in the present disclosure is a cured object obtained by applying the solution to the powder material for 3D modeling of the present disclosure or a cured object obtained by applying the solution to the powder material for 3D modeling in the material set for 3D modeling of the present disclosure. The 3D object is used as a cured object for sintering to manufacture an object (sintered compact of the 3D object) by sintering.

The 3D object is obtained by simply applying the solution to the powder material for 3D modeling but has a sufficient strength. In the 3D object, the base particles are densely present and only a very minute amount of the resin is present around the base particles. As a result, when a sintered object (sintered compact) is obtained by sintering after manufacturing the 3D object, unlike a typical cured object of powder or particle obtained by using an adhesive, etc., unnecessary voids (marks of removed grease), etc. are not present since the amount of volatile organic component (removal of grease) is reduced. As a consequence, the sintered compact has an aesthetic appearance.

The strength of the 3D object is, for example, such that no losing shape, etc. is caused by abrading the surface or no cracking occurs when the object is subject to air blow treatment using an air gun having a nozzle diameter of 2 mm and an air pressure of 0.3 MPa at 5 cm away from the object.

Method of Manufacturing 3D Object and Device for Manufacturing 3D Object

The method of manufacturing a 3D object of the present disclosure includes forming a powder material layer, curing the powder material layer, and other optional steps such as sintering.

The 3D object is manufactured by repeating the steps of forming the powder material layer and curing the powder material layer.

The device for manufacturing a 3D object of the present disclosure includes a powder layer forming device and a solution applying device. Preferably, it has a powder containing unit and a solution containing unit with other optional devices such as a solution supplier and a sintering device.

Powder Material Layer Forming Step and Powder Material Layer Forming Device

The powder layer forming step includes forming a powder material layer for 3D modeling on a substrate by using the powder material for 3D modeling of the present disclosure.

The powder material layer forming device forms a powder material layer for 3D modeling of the present disclosure on a substrate.

Substrate

The substrate is not particularly limited as long as the powder material for 3D modeling can be placed thereon and can be suitably determined to a particular application. For example, a known platform or base plate having a surface on which the powder for 3D modeling is placed is suitably used.

The surface of the substrate, that is, the surface on which the powder material for 3D modeling is placed can be smooth, coarse, plane, or curved plane. It is preferable that the surface of the substrate has a low affinity with the resin when the resin in the powder material for 3D modeling is dissolved.

If the affinity of the surface with the dissolved resin is lower than that of the base particle with the dissolved resin, it is easy to take the obtained 3D object out of the surface.

Layer Forming of Powder Material for 3D Modeling

The method of placing the powder material for 3D modeling on the substrate to form a layer is not particularly limited. For example, a method using a known counter rotation mechanism (counter roller) for use in a selective laser sintering method, a method of extending the powder material for 3D modeling to a thin layer using a member such as a brush, a roller, and a blade, a method of pressing the surface of the powder material for 3D modeling using a pressure member to extend the powder material for 3D modeling to a thin layer, and a method of using a known 3D modeling manufacturing device (device for manufacturing a 3D object) are suitable as the method of placing the powder for 3D modeling in a thin layer.

Using the counter rotation mechanism (counter roller), the brush, the blade, or the pressing member, a layer having a particular thickness of the powder material for 3D modeling can be formed on the substrate, for example, in the following manner:

In an outer frame (also referred to as "form", "hollow cylinder" "tubular structure", etc.), the powder material for 3D modeling is placed by the counter rotation mechanism (counter roller), the brush, the roller or blade, the pressing member, etc. onto the substrate arranged to move up and down slidably along the inside wall of the outer frame. At this point, to use a substrate movable up and down in the outer frame, the substrate is positioned to be slightly lower than the upper open mouth of the outer frame. That is, the substrate with a layer thickness of the powder material for 3D modeling is lowered corresponding to the amount of the thickness. Thereafter, the powder material for 3D modeling is placed on the substrate. The powder material for 3D modeling is thus-placed with a particular thickness on the substrate.

The solution is applied to the powder material for 3D modeling having a particular thickness placed on the substrate. Upon this application, the resin contained in the base particle in the powder material for 3D modeling is dissolved in the solvent in the solution. Therefore, the base particles adhere to each other as water serving as the solvent dries. Consequently, the powder material for 3D modeling present on the substrate is cured (the step of curing the powder material layer described above).

As described above, the powder material for 3D modeling is placed with a particular thickness on the cured material. Thereafter, when the solution is applied to the powder material layer formed on the cured material, the resin contained in the base particle is dissolved and cured. The curing at this point of time occurs not only to the powder material layer having a particular thickness but also to the border between the powder material layer and the cured object that is already cured and present below the powder material layer.

As a consequence, the cured object (3D modeling object) is obtained which has a thickness corresponding to about twice as much as the powder material for 3D modeling placed with a particular thickness.

In addition, it is possible to automatically and simply form a layer of the powder material for 3D modeling having a particular thickness on a substrate by using the known 3D modeling device described above.

In general, the device for manufacturing a 3D object includes a recoater to laminate the powder material for 3D modeling, a movable supplying tank to supply the powder material for 3D modeling onto the substrate, and a movable shape-forming (modeling) tank to form a layer having a particular thickness. In the device for manufacturing a 3D object, the supplying tank can be moved up, the modeling tank can be moved down, or both to constantly keep the surface of the supplying tank slightly above the surface of the modeling tank. Thereafter, the powder material for 3D modeling is placed having a particular thickness by using the recoater from the supplying tank side. The recoater is repeatedly moved to laminate the powder material for 3D modeling having a particular thickness.

The particular thickness is not particularly limited. For example, the average thickness for the layer is preferably from 30 μm to 500 μm and more preferably from 60 μm to 300 μm.

When a cured object (3D object) having a thickness of 30 μm or greater is formed by applying the solution to the powder material for 3D modeling, the cured object has sufficient strength and is free of problems such as losing shape during handling such as sintering after curing. When the thickness is 500 μm or less, the dimension accuracy of the cured object (3D object) of the powder material for 3D modeling is improved.

Incidentally, the average thickness has no particular limit and can be measured according to a known method.

Powder Material Curing Step and Solution Applying Device

The powder material curing step includes applying a solution (modeling liquid) to an area of the powder material layer for 3D modeling formed in the step of forming the powder material layer to cure the area by a solvent contained in the solution to dissolve the resin.

The solution applying device applies the solution containing the solvent to dissolve the resin contained in the base particle to cure the area of the powder material layer for 3D modeling formed by the powder material layer forming device.

The method of applying the solution to the powder material for 3D modeling is not particularly limited and can be selected to a particular application. For example, a dispenser method, a spray method, or an inkjet method is suitable. To execute such a method, a known device is suitably used as the solution applying device.

Of these, the dispenser method has an excellent quantitative property but the application area is small. The spray method is capable of simply forming a fine discharging material, has a wide application area, and demonstrates excellent applicability but the quantitative property thereof is poor so that powder material scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complex shape.

When utilizing the inkjet method, the solution applying device has a nozzle to apply the solution to the powder material for 3D modeling by the inkjet method. As the nozzle, nozzles (discharging head) in a known inkjet printer can be suitably used. In addition, it is possible to use the inkjet printer as the solution applying device. A preferred specific example of the inkjet printer is SG7100, manufactured by Ricoh Company Ltd. It is preferable to use the inkjet printer because the head portion can drip a large amount of the solution at once and the application area is large, which leads to improvement of high application performance.

In the present disclosure, the solution contains no solid materials such as particles or viscous polymers such as resins. As a consequence, even when an inkjet printer capable of accurately and efficiently applying the solution is used, no clogging or corrosion occurs to the nozzle or the head thereof. In addition, when the solution is applied to the powder material for 3D modeling, the solution efficiently permeates into the resin, which leads to good manufacturing efficiency of a 3D object. Furthermore, since no polymer component such as a resin is applied, no unexpected volume increase occurs. Accordingly, it is advantageous to easily and efficiently obtain a cured object with a dimension accuracy in a short time.

When the solution is applied to the powder material for 3D modeling according to the inkjet method, the pH of the solution is preferably from 5 (weak acidity) to 12 (basic) and more preferably from 8 to 10 (weak basic) in terms of prevention of clogging and corrosion of nozzle head portions of nozzles to be used. To regulate the pH, known pH regulators may be used.

Powder Material Containing Unit

The powder material containing unit (container) contains the powder material for 3D modeling. The size, forms, materials, etc. thereof are not particularly limited. For example, a storage tank, a bag, a cartridge, or a tank is suitably selected to a particular application.

Solution Containing Unit

The solution containing unit contains the solution. The size, form, material, etc. thereof are not particularly limited. For example, a storage tank, a bag, a cartridge, or a tank is suitably selected to a particular application.

Other Step and Other Device

The other steps include a drying step, a sintering step, a surface protection treatment step, a coating (application) step, etc.

The other devices include a dryer, a sintering device, a surface protection treatment device, a coating device (applicator), etc.

The drying step is to dry a cured object (3D object) obtained in the powder layer curing step. In the drying step, not only water contained in the cured object but also organic materials may be removed (degreasing). For example, known driers can be used as the drying device.

The sintering step is to sinter a cured material (3D object) formed in the step of curing the powder material layer. According to this sintering step, the cured object is made as an integrated object (sintered compact of the 3D modeling) of metal or ceramic. For example, a known sintering furnace can be used as the sintering device.

The surface protection treatment step is to form a protection layer on a cured object (3D object) formed in the step of curing the powder material layer. By the surface protection treatment, the surface of the cured object (3D object) has durability to a degree that, for example, the object can be used as is. Specific examples of the protection layer include, but are not limited to, a water-resistance layer, a weather resistance layer, a light resistance layer, a heat insulation layer, and a gloss layer. Specific examples of the surface protection treatment device include, but are not limited to, known surface protection treatment devices such as a spraying device and a coating device.

The coating step is to conduct coating for a cured object (3D object) formed in the step of curing the powder material layer. By the coating step, the cured object (3D modeling) is colored in a desired color. Specific examples of the coating device include, but are not limited to, known coating devices using a spray, a roller, a brush.

FIG. 1 is a diagram illustrating an example of the device for manufacturing a 3D object of the present disclosure. The device for manufacturing a 3D object illustrated in FIG. 1 includes a powder material storage tank 1 on the 3D modeling side and a powder storage tank 2 on the powder supplying side. Each of these powder material storage tanks has a stage 3 movable up and down and places the powder material for 3D modeling on the stage 3 to form a thin layer having a particular thickness formed of the powder material.

The solution 4 is dripped from the inkjet head 5 onto the powder layer for 3D modeling in the powder storage tank 1. Moreover, the device for manufacturing a 3D object supplies the powder material for 3D modeling from the powder storage tank 2 to the powder storage tank 1 and also has a recoating mechanism (hereinafter referred to as recoater) 6 to smooth the surface of the powder material (layer) for 3D modeling in the powder storage tank 1.

The solution 4 is dripped from the inkjet head 5 onto the powder material for 3D modeling in the powder storage tank 1. At this point in time, the position where the solution 4 is dripped is determined by two-dimensional image data (slice data) obtained by slicing a desired 3D shape into multiple plane layers.

After completing a depiction corresponding to the amount of a single layer, the stage 3 for the powder storage tank 2 is elevated while the stage 3 for the storage tank 1 is lowered. The amount of the powder material for 3D modeling corresponding to the difference between the stages 3 is moved to the powder storage tank 1 on the 3D modeling side by the recoater 6.

This is how a new layer of the powder material for 3D modeling is formed on the surface of the previously-depicted powder material layer for 3D modeling. The single layer of the powder material for 3D modeling has a thickness of from about several tens μm to about several hundreds μm.

Furthermore, the depiction is conducted on the newly-formed powder material for 3D modeling based on slice data for the second layer (new layer). A series of these steps are repeated to obtain a 3D object. Subsequent to heating and drying by a heater, a final 3D object is obtained.

FIG. 2 is a diagram illustrating another example of the device for manufacturing a 3D object of the present disclosure. The device for manufacturing a 3D object illustrated in FIG. 2 operates on the same principle as that illustrated in FIG. 1. However both have different supplying mechanisms. That is, the powder storage tank 2 is disposed over the powder storage tank 1. When the depiction for the first time is finished, the stage 3 of the powder storage tank 1 is lowered in a predetermined amount and the powder material for 3D modeling is dropped from the powder storage tank 2 to the powder storage tank 1 while moving the powder storage tank 2 to form a new powder layer for 3D modeling. Thereafter, the recoater 6 compresses the powder material for 3D modeling to increase the bulk density and also smooth the height of the powder material layer for 3D modeling.

According to the device for manufacturing a 3D object illustrated in FIG. 2, the configuration of the device is compact in comparison with the configuration illustrated in FIG. 1 in which the two powder storage tanks are disposed side by side.

According to the method of manufacturing a 3D object and the device for manufacturing a 3D object of the present disclosure, a 3D object having a complex form and good dimension accuracy can be simply and efficiently manufactured by using the powder material for 3D modeling of the present disclosure or the material set for 3D modeling of the present disclosure. Furthermore, the thus-manufactured 3D object is free of losing shape before sintering, etc. and has sufficient strength with good dimension accuracy.

Since each of the thus-obtained 3D modeling object and the sintered compact has a sufficient strength and excellent dimension accuracy, representing fine roughness and curved planes, the object has aesthetic aspect with high quality and can be suitably used for various purposes.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Measuring Method of Phase Transition Temperature

The phase transition temperature (gel transition point) of the first water soluble resin for use in Examples and Comparative Examples was measured as follows. The first water soluble resin was dissolved in water to prepare a first aqueous solution of the first water soluble resin having a concentration of two percent by mass.

While heating the two percent by mass aqueous solution from 20 degrees C. to 90 degrees C. at a temperature raising speed of 1 degree C. per minute at 1 atm, the viscosity was measured every 0.5 degrees C. using a twisted variation type viscometer to read the transition point changing from viscosity decrease to viscosity increase from the viscosity curve and the transition point was determined as the gel transition point. The twisted variation type viscometer was VM-200T, manufactured by SEKONIK Company.

Thereafter, while cooling down the two percent by mass aqueous solution from 90 degrees C. to 20 degrees C. at a temperature lowering speed of 0.5 degrees C. per minute at 1 atm, the viscosity was measured every 0.5 degrees C. using the twisted variation type viscometer to confirm that the aqueous solution had thermally reversible sol-gel phase transition.

Example 1

Preparation of Powder Material 1 for 3D Modeling

Preparation of Coating Liquid 1

5.4 parts by mass of acetoacetyl group-modified polyvinyl alcohol (Z-100, average degree of polymerization: 500, manufactured by The Nippon Synthetic Chemical Industry Co., Ltd.) and 0.6 parts by mass of methyl cellulose (SMC-25, manufactured by Shin-Etsu Chemical Co., Ltd.) were mixed with 114 parts of deionized water. The viscosity of the two percent by mass aqueous solution of SMC-25 (manufactured by Shin-Etsu Chemical Co., Ltd.) was 25 mPa·s at 20 degrees C. The phase transition temperature at which the two percent by mass aqueous solution of the methyl cellulose was gelated was 48 degrees C. at 1 atm. Thereafter, while keeping the aqueous solution at 80 degrees C. in a water bath by heating, the solution was stirred for two hours by a three one motor (BL600, manufactured by SHINTO Scientific Co., Ltd.) and thereafter left for three hours for cooling down. 120 parts by mass of 5 percent by mass aqueous solution of acetoacetyl group-modified polyvinyl alcohol and methyl cellulose was thus prepared. The thus-prepared liquid was referred to as [Coating liquid 1].

Coating of Coating Liquid 1 to Surface of Base Particle

Using a coating device, 100 parts by mass of powder of stainless steel (SUS316L) serving as base particle was coated with [Coating liquid 1] under the following coating conditions in such a manner that the coverage thickness was 200 nm. The coating device was MP-01, manufactured by POWREX CORPORATION. As the stainless steel (SUS316L) powder, PSS316L (volume average particle diameter: 41 μm, manufactured by SANYO SPECIAL STEEL Co., Ltd.). [Powder material 1 for 3D modeling] having a volume average particle diameter of 50 μm (evaluation instrument: Microtrac HRA, manufactured by NIK-KISO CO., LTD.) was thus obtained. The coverage thickness was measured as follows:

Coverage Thickness

A sample for observation was prepared by polishing the surface of [Powder material 1 for 3D modeling] by emery paper and thereafter slightly polishing the surface with a wet cloth to dissolve the resin portion. Next, the border between the base portion and the resin portion exposed to the surface was observed by a field-emission-type scanning electron microscope (FE-SEM) and the length between the surface of the resin portion and the border was measured as the coverage thickness. Thereafter, the average of ten measured points was obtained and determined as the coverage thickness (average thickness).

Coating Conditions
Amount of base particle: 1,000 g
Spray setting
Nozzle type: 970
Nozzle diameter: 1.2 mm
Coating liquid discharging pressure: 4.7 Pa·s
Coating liquid discharging speed: 3 g/min.
Atomize air amount: 50 NL/min
Rotor setting
Rotor type: M-1
Rotation speed: 60 rpm
Number of rotation: 400 percent
Air stream setting
Air supply temperature: 80 degrees C.
Air supply amount: 0.8 m$^3$/min.
Bug filter shaking pressure: 0.2 MPa
Bug filter shaking time: 0.3 seconds
Bug filter interval: 5 seconds
Coating time: 80 minutes The compositions of the base particles of the powder materials for 3D modeling used in Examples were shown in Table 1. The compositions of the covering resin of the powder materials for 3D modeling used in Examples were shown in Table 2.

Preparation of Solution 1

70 parts of water and 30 parts of 3-methyi-1,3-butane diol (manufactured by Tokyo Chemical Industry Co. Ltd.) serving as a fluidity adjusting agent were mixed and stirred to obtain [Solution 1].

Example 1

Storage Property 10 g of [Powder material 1 for 3D modeling] was placed in a cylindrical sample bin (20 ml). Thereafter, [Powder material 1 for 3D modeling] was left in an environment of 30 degrees C. and 70 percent humidity for 72 hours while the sample bin was not lidded to observe agglomeration of the powder of the base particles. Thereafter, the sample bin was lidded and placed on a rotation rotor (MIXROTAVMR, manufactured by AS ONE Corporation). The bin was rotated at 80 rpm for 10 minutes to shake [Powder material 1 for 3D modeling] followed by observation on agglomeration. [Powder material 1 for 3D modeling] was observed in the same manner as described above except that the temperature and the humidity were respectively changed from 30 degrees C. and 70 percent to 15 degrees C. and 60 percent. The results are shown in Table 3.

Evaluation Criteria
Yes: Agglomeration of base particle recognized
No: No agglomeration of base particle recognized Thereafter, [Powder material 1 for 3D modeling], [Solution 1], and a form print pattern of the size (70 mm long×12 mm wide) were used to manufacture [3D object 1] in the following manner.

1. Using a known powder laminating device as illustrated as in FIG. 1, [Powder material 1 for 3D modeling] was transferred from the powder storage tank to the 3D modeling tank to form a thin layer of [Powder material 1 for 3D modeling] having an average thickness of 100 μm on a substrate.

2. Next, [Solution 1] was applied (discharged) to the surface of [Powder material 1 for 3D modeling] in the form print pattern from nozzles of a known inkjet discharging head to dissolve the resin covering the base particles to cause [Powder material 1 for 3D modeling] to adhere to each other.

3. Thereafter, the steps 1 and 2 were repeated to laminate [Powder material 1 for 3D modeling] to which the solution had been applied to obtain a 3D object having an average thickness of 3 mm. Thereafter, using a drier, the 3D object was dried at 50 degrees C. for four hours and thereafter 100 degrees C. for 12 hours to obtain [3D object 1].

Losing shape did not occur to the thus-obtained [3D object 1] when extra powder for 3D modeling was removed by air blow.

Bend Stress

[3D object 1] was measured with regard to bend stress in the following manner. The results are shown in Table 3.

Three-point bend stress of [3D object 1] was measured to obtain the intensity (hardness) thereof using a device (Autograph AGS-J, manufactured by Shimadzu Corporation) and a three-point bend test jig (plastic). The bend stress was evaluated according to the following criteria.

Evaluation Criteria

A: 8.0 MPa or more
B: 5.0 MPa to less than 8.0 MPa
C: 3.0 MPa to less than 5.0 MPa
D: Less than 3.0 MPa 4. [3D object 1] obtained in the step 3 described above was heated by a drier to 500 degrees in 3 hours 58 minutes in a nitrogen atmosphere. After maintaining the temperature at 500 degrees C. for four hours, [3D object 1] was cooled down to 300 degrees C. in four hours for degreasing. [3D object 1] was furthermore subject to sintering at 1,300 degrees C. in vacuum condition. As a result, the obtained [3D object (sintered compact) 1] had an aesthetic surface.

This sintered compact was a completely integrated stainless structure (metal lump) and not broken at all when slammed down on a hard floor.

Example 2

The powder material for 3D modeling of Example 2 was obtained in the same manner as in Example 1 except that acetoacetyl group-modified polyvinyl alcohol was changed to diacetone acrylamide-modified polyvinyl alcohol and storage property of the thus-manufactured powder material was evaluated in the same manner as in Example 1. The 3D object of Example 2 was manufactured in the same manner as in Example 1 to measure bend stress thereof in the same manner as in Example 1. DF-05 (average degree of polymerization: 500, manufactured by JAPAN VAM & POVAL CO., LTD.) was used as the diacetone acrylamide-modified polyvinyl alcohol.

Example 3

The powder material for 3D modeling of Example 3 was obtained in the same manner as in Example 1 except that acetoacetyl group-modified polyvinyl alcohol was changed to completely saponified polyvinyl alcohol and storage property of the thus-manufactured powder material was evaluated in the same manner as in Example 1. The 3D object of Example 3 was manufactured in the same manner as in Example 1 to measure bend stress thereof in the same manner as in Example 1. PVA-105 (average degree of polymerization: 500, manufactured by KURARAY CO., LTD.) was used as the completely saponified polyvinyl alcohol. These compositions are shown in Tables 1 and 2 and the results are shown in Table 3.

Example 4

The powder material for 3D modeling of Example 4 was obtained in the same manner as in Example 1 except that acetoacetyl group-modified polyvinyl alcohol was changed to butane diol polyvinyl alcohol and storage property of the thus-manufactured powder material was evaluated in the same manner as in Example 1. The 3D object of Example 5 was manufactured in the same manner as in Example 1 to measure bend stress thereof in the same manner as in Example 1. Nichigo G-Polymer™ OKS-8041 (manufactured by The Nippon Synthetic Chemical Industry Co., Ltd.) was used as the butane diol-modified polyvinyl alcohol. These compositions are shown in Tables 1 and 2 and the results are shown in Table 3.

Example 5

The powder material for 3D modeling of Example 5 was obtained in the same manner as in Example 1 except that acetoacetyl group-modified polyvinyl alcohol was changed to sodium polyacrylate and storage property of the thus-manufactured powder material was evaluated in the same manner as in Example 1. The 3D object of Example 5 was manufactured in the same manner as in Example 1 to measure bend stress thereof in the same manner as in Example 1. JURYMER® AC-103P, manufactured by TOAGOSEI CO., LTD.) was used as sodium polyacryrate. These compositions are shown in Tables 1 and 2 and the results are shown in Table 3.

Example 6

The powder material for 3D modeling of Example 6 was obtained in the same manner as in Example 1 except that the amount of acetoacetyl group-modified polyvinyl alcohol and the amount of methyl cellulose were respectively changed to 5.997 parts by mass and 0.006 parts by mass and storage property of the thus-manufactured powder material was evaluated in the same manner as in Example 1. The 3D object of Example 6 was manufactured in the same manner as in Example 1 to measure bend stress thereof in the same manner as in Example 1. These compositions are shown in Tables 1 and 2 and the results are shown in Table 3.

Example 7

The powder material for 3D modeling of Example 7 was obtained in the same manner as in Example 1 except that the amount of acetoacetyl group-modified polyvinyl alcohol and the amount of methyl cellulose were respectively changed to 5.994 parts by mass and 0.006 parts by mass and storage property of the thus-manufactured powder material was evaluated in the same manner as in Example 1. The 3D object of Example 7 was manufactured in the same manner as in Example 1 to measure bend stress thereof in the same manner as in Example 1. These compositions are shown in Tables 1 and 2 and the results are shown in Table 3.

Example 8

The powder material for 3D modeling of Example 8 was obtained in the same manner as in Example 1 except that the amount of acetoacetyl group-modified polyvinyl alcohol and the amount of methyl cellulose were respectively changed to 5.82 parts by mass and 0.18 parts by mass and storage property of the thus-manufactured powder material was evaluated in the same manner as in Example 1. The 3D object of Example 8 was manufactured in the same manner as in Example 1 to measure bend stress thereof in the same manner as in Example 1. These compositions are shown in Tables 1 and 2 and the results are shown in Table 3.

Example 9

The powder material for 3D modeling of Example 9 was obtained in the same manner as in Example 1 except that the amount of acetoacetyl group-modified polyvinyl alcohol and the amount of methyl cellulose were respectively changed to 5.4 parts by mass and 0.6 parts by mass and storage property of the thus-manufactured powder material was evaluated in the same manner as in Example 1. The 3D object of Example 9 was manufactured in the same manner as in Example 1 to measure bend stress thereof in the same manner as in Example 1. These compositions are shown in Tables 1 and 2 and the results are shown in Table 3.

Example 10

The powder material for 3D modeling of Example 10 was obtained in the same manner as in Example 1 except that the amount of acetoacetyl group-modified polyvinyl alcohol and the amount of methyl cellulose were respectively changed to 4.2 parts by mass and 1.8 parts by mass and storage property of the thus-manufactured powder material was evaluated in the same manner as in Example 1. The 3D object of Example 10 was manufactured in the same manner as in Example 1 to measure bend stress thereof in the same manner as in Example 1. These compositions are shown in Tables 1 and 2 and the results are shown in Table 3.

Example 11

The powder material for 3D modeling of Example 11 was obtained in the same manner as in Example 1 except that the amount of acetoacetyl group-modified polyvinyl alcohol and the amount of methyl cellulose were respectively changed to 3.0 parts by mass and 3.0 parts by mass and storage property of the thus-manufactured powder material was evaluated in the same manner as in Example 1. The 3D object of Example 11 was manufactured in the same manner as in Example 1 to measure bend stress thereof in the same manner as in Example 1. These compositions are shown in Tables 1 and 2 and the results are shown in Table 3.

Example 12

The powder material for 3D modeling of Example 12 was obtained in the same manner as in Example 8 except that acetoacetyl group-modified polyvinyl alcohol was changed to diacetone acrylamide-modified polyvinyl alcohol and storage property of the thus-manufactured powder material was evaluated in the same manner as in Example 8. The 3D object of Example 12 was manufactured in the same manner as in Example 8 to measure bend stress thereof in the same manner as in Example 8. DF-05 (average degree of polymerization: 500, manufactured by JAPAN VAM & POVAL CO., LTD.) was used as the diacetone acrylamide-modified polyvinyl alcohol. These compositions are shown in Tables 1 and 2 and the results are shown in Table 3.

Example 13

The powder material for 3D modeling of Example 13 was obtained in the same manner as in Example 13 except that acetoacetyl group-modified polyvinyl alcohol was changed to diacetone acrylamide-modified polyvinyl alcohol and storage property of the thus-manufactured powder material was evaluated in the same manner as in Example 9. The 3D object of Example 13 was manufactured in the same manner as in Example 9 to measure bend stress thereof in the same manner as in Example 9. DF-05 (average degree of polymerization: 500, manufactured by JAPAN VAM & POVAL CO., LTD.) was used as the diacetone acrylamide-modified polyvinyl alcohol. These compositions are shown in Tables 1 and 2 and the results are shown in Table 3.

Example 14

The powder material for 3D modeling of Example 14 was obtained in the same manner as in Example 10 except that acetoacetyl group-modified polyvinyl alcohol was changed to diacetone acrylamide-modified polyvinyl alcohol and storage property of the thus-manufactured powder material was evaluated in the same manner as in Example 10. The 3D object of Example 14 was manufactured in the same manner as in Example 10 to measure bend stress thereof in the same manner as in Example 10. DF-05 (average degree of polymerization: 500, manufactured by JAPAN VAM & POVAL CO., LTD.) was used as the diacetone acrylamide-modified polyvinyl alcohol. These compositions are shown in Tables 1 and 2 and the results are shown in Table 3.

Example 15

The powder material for 3D modeling of Example 15 was obtained in the same manner as in Example 1 except that methyl cellulose (SMC-25) was changed to methyl cellulose (SMC-15) and storage property of the thus-manufactured powder material was evaluated in the same manner as in Example 1. The 3D object of Example 15 was manufactured in the same manner as in Example 1 to measure bend stress thereof in the same manner as in Example 1. The viscosity of the two percent by mass aqueous solution of SMC-15 (manufactured by Shin-Etsu Chemical Co., Ltd.) was 15 mPa·s at 20 degrees C. These compositions are shown in Tables 1 and 2 and the results are shown in Table 3.

Example 16

The powder material for 3D modeling of Example 16 was obtained in the same manner as in Example 1 except that methyl cellulose (SMC-25) was changed to methyl cellulose (SMC-6) and storage property of the thus-manufactured powder material was evaluated in the same manner as in Example 1. The 3D object of Example 16 was manufactured in the same manner as in Example 1 to measure bend stress thereof in the same manner as in Example 1. The viscosity of the two percent by mass aqueous solution of SMC-6 (manufactured by Shin-Etsu Chemical Co., Ltd.) was 6 mPa·s at 20 degrees C. These compositions are shown in Tables 1 and 2 and the results are shown in Table 3.

Example 17

The powder material for 3D modeling of Example 17 was obtained in the same manner as in Example 1 except that methyl cellulose (SMC-25) was changed to methyl cellulose (SMC-50) and storage property of the thus-manufactured powder material was evaluated in the same manner as in Example 1. The 3D object of Example 17 was manufactured in the same manner as in Example 1 to measure bend stress thereof in the same manner as in Example 1. The viscosity of the two percent by mass aqueous solution of SMC-50 (manufactured by Shin-Etsu Chemical Co., Ltd.) was 50 mPa·s at 20 degrees C. These compositions are shown in Tables 1 and 2 and the results are shown in Table 3.

Example 18

The powder material for 3D modeling of Example 18 was obtained in the same manner as in Example 1 except that methyl cellulose was changed to hydroxy propyl methyl cellulose and storage property of the thus-manufactured powder material was evaluated in the same manner as in Example 1. The 3D object of Example 18 was manufactured in the same manner as in Example 1 to measure bend stress thereof in the same manner as in Example 1. 60SH-3 (viscosity of two percent by mass aqueous solution at 20 degrees C.: 3 mPa·s, manufactured by Shin-Etsu Chemical Co., Ltd.) was used as the hydroxy propyl methyl cellulose. The phase transition temperature at which the two percent by mass aqueous solution of the hydroxy propyl methyl cellulose was gelated was 86 degrees C. at 1 atm.

Example 19

The powder material for 3D modeling of Example 19 was obtained in the same manner as in Example 1 except that methyl cellulose was changed to hydroxy propyl methyl cellulose and storage property of the thus-manufactured powder material was evaluated in the same manner as in Example 1. The 3D object of Example 19 was manufactured in the same manner as in Example 1 to measure bend stress thereof in the same manner as in Example 1. 60SH-15 (viscosity of two percent by mass aqueous solution at 20 degrees C.: 15 mPa·s, manufactured by Shin-Etsu Chemical Co., Ltd.) was used as the hydroxy propyl methyl cellulose. These compositions are shown in Tables 1 and 2 and the results are shown in Table 3.

Example 20

The powder material for 3D modeling of Example 20 was obtained in the same manner as in Example 1 except that the powder of stainless steel (SUS316L) of base particle was changed to silica particles and storage property of the thus-manufactured powder material was evaluated in the same manner as in Example 1. The 3D object of Example 20 was manufactured in the same manner as in Example 1 to measure bend stress thereof in the same manner as in Example 1. EXCELICA SE-15K (volume average particle diameter: 24 μm, manufactured by Tokuyama Corporation) was used as the silica particle. These compositions are shown in Tables 1 and 2 and the results are shown in Table 3.

Example 21

The powder material for 3D modeling of Example 21 was obtained in the same manner as in Example 1 except that the powder of stainless steel (SUS316L) of base particle was changed to alumina particles and storage property of the thus-manufactured powder material was evaluated in the same manner as in Example 1. The 3D object of Example 21 was manufactured in the same manner as in Example 1 to measure bend stress thereof in the same manner as in Example 1. TAIMICRON TM-5D (volume average particle diameter: 0.3 μm, manufactured by TAIMEI CHEMICALS Co., Ltd.) was used as the alumina particle. These compositions are shown in Tables 1 and 2 and the results are shown in Table 3.

Preparation of Solution 2

0.1 parts by mass of an ammonium salt of zirconium carbonate serving as cross-linking agent was added to and mixed and stirred with 70 parts of water and 30 parts of 3-methyi-1,3-butane diol serving as fluidity adjusting agent to prepare [Solution 2]. M0818 (manufactured by Tokyo Chemical Industry Co. Ltd.) was used as the 3-methyi-1,3-butane diol. AC20 (manufactured by DAIICHI KIGENSO KAGAKU KOGYO CO., LTD.) was used as the ammonium salt of zirconium carbonate

Example 22

The powder material for 3D modeling of Example 22 was obtained in the same manner as in Example 1 except that [Solution 1] was changed to [Solution 2] and storage property of the thus-manufactured powder material was evaluated in the same manner as in Example 1. The 3D object of Example 22 was manufactured in the same manner as in Example 1 and bend stress thereof was measured in the same manner as in Example 1. These compositions are shown in Tables 1 and 2 and the results are shown in Table 3.

Example 23

The powder material for 3D modeling of Example 23 was obtained in the same manner as in Example 22 except that ammonium salt of zirconium carbonate in [Solution 2] was changed to an ester of glyoxyl acid and storage property of the thus-manufactured powder material was evaluated in the same manner as in Example 22. The 3D object of Example 23 was manufactured in the same manner as in Example 22 to measure bend stress thereof in the same manner as in Example 22. Safelink SPM-02 (manufactured by The Nippon Synthetic Chemical Industry Co., Ltd.) was used as the ester of glyoxyl acid. These compositions are shown in Tables 1 and 2 and the results are shown in Table 3.

Example 24

The powder material for 3D modeling of Example 24 was obtained in the same manner as in Example 22 except that ammonium salt of zirconium carbonate in [Solution 2] was changed to adipic dihydrazide and storage property of the thus-manufactured powder material was evaluated in the same manner as in Example 22. The 3D object of Example 24 was manufactured in the same manner as in Example 22 to measure bend stress thereof in the same manner as in Example 22. ADH (manufactured by JAPAN FINECHEM COMPANY, INC.) was used as the adipic dihydrazide These compositions are shown in Tables 1 and 2 and the results are shown in Table 3.

Comparative Example 1

The powder material for 3D modeling of Comparative Example 1 was obtained in the same manner as in Example 1 except that 5.4 parts by mass of acetoacetyl group-modified polyvinyl alcohol and 0.6 parts by mass of methyl cellulose were changed to 6 parts by mass of carboxymethyl cellulose and storage property of the thus-manufactured powder material was evaluated in the same manner as in Example 1. The 3D object of Comparative Example 1 was manufactured in the same manner as in Example 1 to measure bend stress thereof in the same manner as in Example 1. 1120 (viscosity of two percent by mass aqueous solution at 20 degrees C.: 25 mPa·s, manufactured by DAICEL FINECHEM LTD.) was used as the carboxymethyl cellulose. The phase transition temperature at which the two percent by mass aqueous solution of the methyl cellulose was gelated was not confirmed. These compositions are shown in Tables 1 and 2 and the results are shown in Table 3.

Comparative Example 2

The powder material for 3D modeling of Comparative Example 2 was obtained in the same manner as in Example 3 except that methyl cellulose was changed to carboxymethyl cellulose and storage property of the thus-manufactured powder material was evaluated in the same manner as in Example 1. Next, the 3D object of Comparative Example 2 was manufactured in the same manner as in Example 1 to measure bend stress thereof in the same manner as in Example 1. 1120 (viscosity of two percent by mass aqueous solution at 20 degrees C.: 25 mPa·s, manufactured by DAICEL FINECHEM LTD.) was used as the carboxymethyl cellulose. These compositions are shown in Tables 1 and 2 and the results are shown in Table 3.

Comparative Example 3

The powder material for 3D modeling of Comparative Example 3 was obtained in the same manner as in Example 1 except that 5.4 parts by mass of acetoacetyl group-modified polyvinyl alcohol and 0.6 parts by mass of methyl cellulose were changed to 6 parts by mass of methyl cellulose and storage property of the thus-manufactured powder material was evaluated in the same manner as in Example 1. The 3D object of Comparative Example 3 was manufactured in the same manner as in Example 1 to measure bend stress thereof in the same manner as in Example 1. SMC-25 (manufactured by Shin-Etsu Chemical Co., Ltd.) was used as the methyl cellulose. These compositions are shown in Tables 1 and 2 and the results are shown in Table 3.

TABLE 1

| | Core material | | |
|---|---|---|---|
| | Kind of core material | Volume average particle diameter | Product name |
| Example 1 | SUS316L | 41 μm | PSS316L |
| Example 2 | SUS316L | 41 μm | PSS316L |
| Example 3 | SUS316L | 41 μm | PSS316L |
| Example 4 | SUS316L | 41 μm | PSS316L |
| Example 5 | SUS316L | 41 μm | PSS316L |
| Example 6 | SUS316L | 41 μm | PSS316L |
| Example 7 | SUS316L | 41 μm | PSS316L |
| Example 8 | SUS316L | 41 μm | PSS316L |
| Example 9 | SUS316L | 41 μm | PSS316L |
| Example 10 | SUS316L | 41 μm | PSS316L |
| Example 11 | SUS316L | 41 μm | PSS316L |
| Example 12 | SUS316L | 41 μm | PSS316L |
| Example 13 | SUS316L | 41 μm | PSS316L |
| Example 14 | SUS316L | 41 μm | PSS316L |
| Example 15 | SUS316L | 41 μm | PSS316L |
| Example 16 | SUS316L | 41 μm | PSS316L |
| Example 17 | SUS316L | 41 μm | PSS316L |
| Example 18 | SUS316L | 41 μm | PSS316L |
| Example 19 | SUS316L | 41 μm | PSS316L |
| Example 20 | Silica | 24 μm | EXCELICA SE-15K |
| Example 21 | Alumina | 0.3 μm | TAIMICRON TM-5D |
| Example 22 | SUS316L | 41 μm | PSS316L |
| Example 23 | SUS316L | 41 μm | PSS316L |
| Example 24 | SUS316L | 41 μm | PSS318L |
| Comparative Example 1 | SUS316L | 41 μm | PSS316L |
| Comparative Example 2 | SUS316L | 41 μm | PSS316L |
| Comparative Example 3 | SUS316L | 41 μm | PSS316L |

TABLE 2

| | Covering resin | | | | |
|---|---|---|---|---|---|
| | First water soluble resin | | | | |
| | Compound | Viscosity | Product name | Ratio | Phase transition temperature |
| Example 1 | Methyl cellulose | 25 mPa·s | MC-25 | 10.00 percent | 48 degrees C. |
| Example 2 | Methyl cellulose | 25 mPa·s | MC-25 | 10.00 percent | 48 degrees C. |
| Example 3 | Methyl cellulose | 25 mPa·s | MC-25 | 10.00 percent | 48 degrees C. |
| Example 4 | Methyl cellulose | 25 mPa·s | MC-25 | 10.00 percent | 48 degrees C. |
| Example 5 | Methyl cellulose | 25 mPa·s | MC-25 | 10.00 percent | 48 degrees C. |
| Example 6 | Methyl cellulose | 25 mPa·s | MC-25 | 0.05 percent | 48 degrees C. |
| Example 7 | Methyl cellulose | 25 mPa·s | MC-25 | 0.10 percent | 48 degrees C. |
| Example 8 | Methyl cellulose | 25 mPa·s | MC-25 | 3.00 percent | 48 degrees C. |
| Example 9 | Methyl cellulose | 25 mPa·s | MC-25 | 10.00 percent | 48 degrees C. |
| Example 10 | Methyl cellulose | 25 mPa·s | MC-25 | 30.00 percent | 48 degrees C. |
| Example 11 | Methyl cellulose | 25 mPa·s | MC-25 | 50.00 percent | 48 degrees C. |
| Example 12 | Methyl cellulose | 25 mPa·s | MC-25 | 0.10 percent | 48 degrees C. |
| Example 13 | Methyl cellulose | 25 mPa·s | MC-25 | 20.00 percent | 48 degrees C. |

TABLE 2-continued

| | Covering resin First water soluble resin | | | | |
|---|---|---|---|---|---|
| | Compound | Viscosity | Product name | Ratio | Phase transition temperature |
| Example 14 | Methyl cellulose | 25 mPa·s | MC-25 | 30.00 percent | 48 degrees C. |
| Example 15 | Methyl cellulose | 15 mPa·s | MC-15 | 10.00 percent | 46 degrees C. |
| Example 16 | Methyl cellulose | 6 mPa·s | MC-6 | 10.00 percent | 42 degrees C. |
| Example 17 | Methyl cellulose | 50 mPa·s | MC-50 | 10.00 percent | 50 degrees C. |
| Example 18 | Hydroxy propyl methyl cellulose | 3 mPa·s | 60SH-3 | 10.00 percent | 86 degrees C. |
| Example 19 | Hydroxy propyl methyl cellulose | 15 mPa·s | SH-15 | 10.00 percent | 89 degrees C. |
| Example 20 | Methyl cellulose | 25 mPa·s | MC-25 | 10.00 percent | 48 degrees C. |
| Example 21 | Methyl cellulose | 25 mPa·s | MC-25 | 10.00 percent | 48 degrees C. |
| Example 22 | Methyl cellulose | 25 mPa·s | MC-25 | 10.00 percent | 48 degrees C. |
| Example 23 | Methyl cellulose | 25 mPa·s | MC-25 | 10.00 percent | 48 degrees C. |
| Example 24 | Methyl cellulose | 25 mPa·s | MC-25 | 10.00 percent | 48 degrees C. |
| Comparative Example 1 | Carboxy methyl cellulose | 25 mPa·s | CMC 1230 | 100.00 percent | None |
| Comparative Example 2 | Carboxy methyl cellulose | 25 mPa·s | CMC 1230 | 10.00 percent | None |
| Comparative Example 3 | Methyl cellulose | 25 mPa·s | MC-25 | 100.00 percent | 48 degrees C. |

| | Covering resin Second water soluble resin | | | |
|---|---|---|---|---|
| | Compound | Degree of polymerization | Product name | Ratio |
| Example 1 | Acetoacetyl PVA | 500 | Z100 | 90.00 percent |
| Example 2 | Diacetone acrylamide-modified PVA | 500 | DF-05 | 90.00 percent |
| Example 3 | Completely-saponified PVA | 500 | PVA-105 | 90.00 percent |
| Example 4 | Butane diol-modified PVA | 500 | 8041 | 90.00 percent |
| Example 5 | Sodium Polyacrylate | — | AC 103P | 90.00 percent |
| Example 6 | Acetoacetyl PVA | 500 | Z100 | 99.95 percent |
| Example 7 | Acetoacetyl PVA | 500 | Z100 | 99.90 percent |
| Example 8 | Acetoacetyl PVA | 500 | Z100 | 97.00 percent |
| Example 9 | Acetoacetyl PVA | 500 | Z100 | 90.00 percent |
| Example 10 | Acetoacetyl PVA | 500 | Z100 | 70.00 percent |
| Example 11 | Acetoacetyl PVA | 500 | Z100 | 50.00 percent |
| Example 12 | Diacetone acrylamide-modified PVA | 500 | DF-05 | 99.90 percent |
| Example 13 | Diacetone acrylamide-modified PVA | 500 | DF-05 | 80.00 percent |
| Example 14 | Diacetone acrylamide-modified PVA | 500 | DF-05 | 70.00 percent |
| Example 15 | Acetoacetyl PVA | 500 | Z100 | 90.00 percent |
| Example 16 | Acetoacetyl PVA | 500 | Z100 | 90.00 percent |
| Example 17 | Acetoacetyl PVA | 500 | Z100 | 90.00 percent |
| Example 18 | Acetoacetyl PVA | 500 | Z100 | 90.00 percent |
| Example 19 | Acetoacetyl PVA | 500 | Z100 | 90.00 percent |
| Example 20 | Acetoacetyl PVA | 500 | Z100 | 90.00 percent |
| Example 21 | Acetoacetyl PVA | 500 | Z100 | 90.00 percent |
| Example 22 | Acetoacetyl PVA | 500 | Z100 | 90.00 percent |
| Example 23 | Acetoacetyl PVA | 500 | Z100 | 90.00 percent |
| Example 24 | Acetoacetyl PVA | 500 | Z100 | 90.00 percent |
| Comparative Example 1 | — | — | — | 0.00 percent |
| Comparative Example 2 | Completely-saponified PVA | 500 | PVA-105 | 90.00 percent |
| Comparative Example 3 | — | — | — | 0.00 percent |

TABLE 3

| | Strength of object | | Storage property | | | |
|---|---|---|---|---|---|---|
| | | | 30 degrees C. and 70 percent | | 15 degrees C. and 60 percent | |
| | Bend stress | | Agglomeration | Agglomeration | Agglomeration | Agglomeration |
| | Mpa | Evaluation | (initial) | (after shaking) | (initial) | (after shaking) |
| Example 1 | 5.5 | B | No | No | No | No |
| Example 2 | 6.5 | B | No | No | No | No |
| Example 3 | 4.5 | C | No | No | No | No |
| Example 4 | 6.0 | B | No | No | No | No |
| Example 5 | 3.0 | C | Yes | No | No | No |
| Example 6 | 6.0 | B | Yes | No | No | No |
| Example 7 | 6.0 | B | No | No | No | No |
| Example 8 | 5.8 | B | No | No | No | No |
| Example 9 | 5.6 | B | No | No | No | No |
| Example 10 | 5.2 | B | No | No | No | No |
| Example 11 | 4.8 | C | No | No | Yes | No |
| Example 12 | 6.8 | B | No | No | No | No |
| Example 13 | 6.3 | B | No | No | No | No |
| Example 14 | 5.5 | B | No | No | No | No |
| Example 15 | 5.5 | B | No | No | No | No |
| Example 16 | 5.5 | B | No | No | No | No |
| Example 17 | 4.5 | B | No | No | No | No |
| Example 18 | 5.0 | B | Yes | No | No | No |
| Example 19 | 5.5 | B | Yes | No | No | No |
| Example 20 | 3.0 | C | No | No | No | No |
| Example 21 | 3.0 | C | No | No | No | No |
| Example 22 | 8.0 | A | No | No | No | No |
| Example 23 | 7.0 | B | No | No | No | No |
| Example 24 | 6.5 | B | No | No | No | No |
| Comparative Example 1 | 2.0 | D | Yes | Yes | Yes | Yes |
| Comparative Example 2 | 4.5 | C | Yes | Yes | No | No |
| Comparative Example 3 | 2.0 | D | No | No | Yes | Yes |

Embodiments of the present disclosure are, for example, as follows.

1. A powder material for three-dimensional modeling includes a base particle and a resin including a first water soluble resin and a second water soluble resin. A first aqueous solution of the first water soluble resin having a concentration of two percent by mass has a thermally reversible sol-gel phase transition and is gelated at temperatures higher than a phase transition temperature of the first aqueous solution.

2. In the powder material of 1 described above, the first water soluble resin includes cellulose or a derivative thereof.

3. In the powder material of 2 described above, the first water soluble resin includes methyl cellulose.

4. In the powder material of any one of 1 to 3 described above, the mass ratio of the first water soluble resin to the second water soluble resin is from 0.1/99.9 to 10/90.

5. In the powder material any one of 1 to 4 described above, the first aqueous solution has a viscosity of from 3 mPa·s to 25 mPa·s at 20 degrees C.

6. In the powder material any one of 1 to 5 described above, the phase transition temperature is from 35 degrees C. to 90 degrees C.

7. In the powder material any one of 1 to 6 described above, the second aqueous solution of the second water soluble resin having a concentration of two percent by mass has a thermally reversible sol-gel phase transition and is gelated at temperatures lower than a second phase transition temperature of the second aqueous solution or has no thermally reversible sol-gel phase transition.

8. In the powder according to any one of 1 to 7 described above, the second water soluble resin includes a modified polyvinyl alcohol.

9. In the powder material of any one of 1 to 8, the base particle is covered with the resin.

10. In the powder material of any one of 1 to 9 described above, the base particle is insoluble in water.

11. In the powder material of any one of 1 to 10 described above, the base particle includes either or both of a metal and ceramic.

12. A material set for three-dimensional modeling includes the powder material of any one of 1 to 11 described above and
a solution containing a solvent to dissolve the resin.

13. In the material set of 12 described above, the solution includes a cross-linking agent to cross-link with the resin.

14. In the material set of 13 described above, the cross linking agent includes a compound containing a metal.

15. A method of manufacturing a three-dimensional object includes forming a layer of the powder material of any one of 1 to 11 having a thickness, applying a solution to an area of the layer, the solution including a solvent to dissolve the resin, and repeating the forming and the applying to manufacture the three-dimensional object.

16. The method of 15 described above, the solution is applied by an inkjet discharging method.

17. A device for manufacturing a three-dimensional object includes a powder material layer forming device to form a layer having a thickness on a substrate, the layer being formed of the powder material of any one of 1 to 11, and a solution applying device to apply a solution to an area of the layer. The solution includes a solvent to dissolve the resin.

18. A three-dimensional object is 3D-modeled by using the powder material of any one of 1 to 11 described above.

According to the present disclosure, a powder material for 3D modeling is provided suitable to manufacture a 3D object having a sufficient strength to maintain its complex form and have excellent storage property.

Having now fully described embodiments of the present invention, it will be apparent to one of ordinary skill in the art that many changes and modifications can be made thereto without departing from the spirit and scope of embodiments of the invention as set forth herein.

What is claimed is:

1. A material set for three-dimensional modeling, comprising:
    a powder material comprising
        a base particle, and
        a resin comprising a first water soluble resin and a second water soluble resin; and
    a solution comprising a solvent to dissolve the resin comprising the first water soluble resin and the second water soluble resin,
    wherein a first aqueous solution of the first water soluble resin having a concentration of two percent by mass has a thermally reversible sol-gel phase transition and is gelated at temperatures higher than a first phase transition temperature of the first aqueous solution,
    wherein a mass ratio of the first water soluble resin to the second water soluble resin is from 0.1/99.9 to 10/90, and
    wherein the solution comprises a cross-linking agent to cross-link with the resin comprising the first water soluble resin and the second water soluble resin.

2. The material set according to claim 1, wherein the first water soluble resin comprises cellulose or a derivative of cellulose.

3. The material set according to claim 1, wherein the first water soluble resin comprises methyl cellulose.

4. The material set according to claim 1, wherein the first aqueous solution has a viscosity of from 3 mPa·s to 25 mPa·s at 20 degrees C.

5. The material set according to claim 1, wherein the phase transition temperature of the material is from 35 degrees C. to 90 degrees C.

6. The material set according to claim 1, wherein a second aqueous solution of the second water soluble resin having a concentration of two percent by mass has a thermally reversible sol-gel phase transition and is gelated at temperatures lower than a second phase transition temperature of the second aqueous solution or has no thermally reversible sol-gel phase transition.

7. The material set according to claim 1, wherein the second water soluble resin comprises a modified polyvinyl alcohol.

8. The material set according to claim 1, wherein the base particle is covered with the resin comprising the first water soluble resin and the second water soluble resin.

9. The material set according to claim 1, wherein the base particle is insoluble in water.

10. The material set according to claim 1, wherein the base particle comprises either or both of a metal and ceramic.

11. The material set according to claim 1, wherein the cross-linking agent comprises a compound comprising a metal.

12. The material set according to claim 1, wherein
    the first water soluble resin comprises at least one selected from the group consisting of methyl cellulose and hydroxy propyl methyl cellulose, and
    the second water soluble resin comprises at least one selected from the group consisting of acetoacetyl polyvinyl alcohol, diacetone acrylamide-modified polyvinyl alcohol, completely saponified polyvinyl alcohol, butane diol-modified polyvinyl alcohol, sodium polyacrylate, diacetone acrylamide-modified polyvinyl alcohol.

13. The material set according to claim 12, wherein a mass ratio of the first water soluble resin to the second water soluble resin is from 3/97 to 10/90.

14. A three-dimensional object comprising:
    the material set of claim 1.

15. A method of manufacturing a three-dimensional object with the material set according to claim 1, the method comprising:
    forming a layer of the powder material having a thickness; and
    applying the solution to an area of the layer, the solution comprising a solvent to dissolve the resin comprising the first water soluble resin and the second water soluble resin,
    wherein the forming a layer and the applying a solution are repeated to manufacture the three-dimensional object.

16. The method according to claim 15, wherein the applying is conducted by an inkjet discharging method.

17. A powder material for three dimensional modeling comprising:
    a base particle;
    and a resin comprising a first water soluble resin and a second water soluble resin,
    wherein a first aqueous solution of the first water soluble resin having a concentration of two percent by mass has a thermally reversible sol-gel phase transition and is gelated at temperatures higher than a first phase transition temperature of the first aqueous solution, wherein a mass ratio of the first water soluble resin to the second water soluble resin is from 0.1/99.9 to 10/90,
    wherein the base particle comprises either or both of a metal and ceramic, and
    wherein the first water soluble resin comprises at least one selected from the group consisting of methyl cellulose and hydroxy propyl methyl cellulose, and
    the second water soluble resin comprises at least one selected from the group consisting of acetoacetyl polyvinyl alcohol, diacetone acrylamide-modified polyvinyl alcohol, completely saponified polyvinyl alcohol, butane diol-modified polyvinyl alcohol, sodium polyacrylate, diacetone acrylamide-modified polyvinyl alcohol.

* * * * *